United States Patent
Gharabally (10) Patent No.: US 9,183,534 B2
(45) Date of Patent: Nov. 10, 2015

(54) DEVICES WITH PROFILE-BASED OPERATING MODE CONTROLS

(75) Inventor: Sam Gharabally, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 781 days.

(21) Appl. No.: 12/484,142

(22) Filed: Jun. 12, 2009

(65) Prior Publication Data

US 2010/0319053 A1 Dec. 16, 2010

(51) Int. Cl.
*G06F 17/30* (2006.01)
*G06Q 10/10* (2012.01)
*G06F 21/60* (2013.01)

(52) U.S. Cl.
CPC .............. *G06Q 10/10* (2013.01); *G06F 21/604* (2013.01)

(58) Field of Classification Search
CPC ........ G06F 21/604; G06F 21/62; G06Q 10/10
USPC ............................................. 726/2, 6, 7, 27, 4
See application file for complete search history.

(56) References Cited

U.S. PATENT DOCUMENTS

| | | | |
|---|---|---|---|
| 7,373,142 B2 | 5/2008 | Scott | |
| 7,522,909 B2 | 4/2009 | Bushnell et al. | |
| 2002/0013815 A1* | 1/2002 | Obradovich et al. | ......... 709/204 |
| 2002/0143997 A1* | 10/2002 | Huang et al. | ................... 709/248 |
| 2003/0123422 A1* | 7/2003 | Miya | .............................. 370/338 |
| 2005/0005131 A1* | 1/2005 | Yoshida et al. | ............... 713/183 |
| 2007/0243862 A1 | 10/2007 | Coskun et al. | |
| 2008/0233957 A1* | 9/2008 | Akama | ...................... 455/435.1 |
| 2009/0036111 A1 | 2/2009 | Danford et al. | |
| 2009/0088142 A1 | 4/2009 | Baribault et al. | |
| 2009/0165145 A1* | 6/2009 | Haapsaari et al. | ............... 726/28 |
| 2009/0282473 A1* | 11/2009 | Karlson et al. | ................... 726/17 |
| 2010/0190474 A1* | 7/2010 | Rajguru | ..................... 455/412.1 |

* cited by examiner

*Primary Examiner* — Peter Shaw
(74) *Attorney, Agent, or Firm* — Fish & Richardson P.C.

(57) ABSTRACT

A device (e.g., a phone) can be provided by an entity (e.g., a business) to a user (e.g., an employee). The device includes a profile manager that allows the user to configure a personal profile comprising any of applications, settings, and stored data. The device is also configurable with an entity profile determined by the entity that also may include applications, settings, and stored data. The user can select from operating modes comprising at least a personal mode, and a unity mode; an entity mode also may be available for selection. The profile manager, based on the selected mode, determines whether entity profile data and applications are available to the user, and which applications from either profile may conduct user-perceptible activities. The profile manager may periodically verify entity profile rights with a server, and if verification fails, then the profile manager can restrict entity profile data and applications access, regardless of operating mode.

28 Claims, 8 Drawing Sheets

DEVICES WITH PROFILE-BASED OPERATING MODE CONTROLS

BACKGROUND

1. Field

The following relates to computing and/or communication devices, such as cell phones, laptops, smart phones, digital assistants, and more particularly to approaches for facilitating multi-role usages of such devices.

2. Related Art

Today, many companies provide their employees with a device that can be used for activities such as sending and receiving e-mail, instant messages, tweets, and so on. Such devices also can have a variety of additional functions, such as being able to run applications. Such applications can include business applications, such as presentation tools, spreadsheets, analytical tools, and so on. Further, many of these devices now have large storage capacity, such that a wider variety of data can be stored for longer periods of time on the devices. These devices also have an increasingly sophisticated suite of network interfaces, including Personal Area Networking (e.g., Bluetooth), wireless LAN (e.g., 802.11 series wireless standards), and Wide Area Network (WAN) technologies, such as an increasingly wide variety of high-speed cellular data technologies being made available.

As such devices have become more full-featured, with better connectivity, entities, such as businesses, have found value in their members (e.g., employees) having these devices available. Users of these devices also have found value in having such devices available more consistently, as they can be increasingly productive and mobile, with more flexibility as to where and when they can work.

Users also have evidenced increased demand for such devices in their personal lives. Many such users desire to have particular applications available to them on their devices, as well as their contacts and other data. However, such users likely also would find it less convenient to carry physically distinct devices for different roles, such as for personal use and for business use. Businesses also may find the value of such devices diminished if users do not have them available when not at work, especially in an increasingly global workforce, spread amongst disparate timezones.

However, users may wish to avoid business-related interruptions at some times. Businesses, and other entities, may desire to enforce access policies for their proprietary data, applications provided on the device, and so on.

Therefore, there is a need for devices and systems that can meet the needs both of users of these devices and entities that may be providing such devices to the users, or otherwise providing data or applications that will be resident on such devices.

SUMMARY

As introduced above, users may desire to have electronic devices that facilitate both business and personal usage. For example, a device, such as a smart phone, may be provided by a company to a user, and that user may use that phone both as a primary business contact point and as a primary personal contact point.

Thus, exemplary aspects include a device that provides user-controllable capabilities, allowing a user to manage device settings, load applications, and store data on the device that are associated with a personal profile. The device also comprises an entity (such as a business) profile, which also can include associated settings, applications, and data.

The device can operate in a personal mode, an entity mode, and a unity mode. In the unity mode, applications and data for both the personal and the entity profile can be made available, while restrictions can be enforced when the device is in a personal mode or an entity mode. In some cases, restrictions on overall device function and usage can be drawn from the entity profile, regardless of a current operating mode.

The device can authenticate periodically with a profile server, which can update information associated with the entity profile, and direct the device to restrict access to entity profile information, or to wipe the device of such information (more broadly, an entity-controlled device can periodically communicate with the device, providing data, applications, and profile settings that will be resident on such devices for usage thereon). Such functionality can be implemented by a profile manager on the device, which can be implemented as a module of instructions executing on a processor, for example.

A device can obtain entity profiles from a plurality of separate entities, or which are otherwise maintained by separate entities. A separate user credential stored on the device can be used to authenticate to receive information for each profile.

A variety of functions, checks, policies, and so on can be implemented, directed or otherwise controlled in accordance with this profile approach. Users may be permitted to download their personal profiles to computers, or to media, in order to port those profiles to other devices or to back them up.

Many other aspects and examples will become apparent from the following disclosure.

BRIEF DESCRIPTION OF THE DRAWINGS

In order to more fully explain describe various aspects, examples, and inventive embodiments, the following figures are provided, in which.

DETAILED DESCRIPTION

In one aspect, this disclosure relates to devices, for example phones, digital assistants of various sorts, netbooks, and the like, that can fulfill both a personal purpose and a business purpose. One aspect complicating usage of a single device for both personal and business usage is allowing a user to have adequate control over the device to be satisfied with using that device as a personal device, while at the same time, protecting a business' proprietary interests. For example, a user may desire to store data, such as songs and videos, to participate in social networking forums, to text, to share videos, tweet, and so on. However, some of these activities can carry risks to device security. For example, worms can be propagate by unsafe activities, social network web pages can contain malicious code, content viewed or uploaded or downloaded can violate corporate policies, applications may be licensed only for particular activities, and so on. Another aspect of concern is that users desire to have some ability to control business intrusions into their personal lives, for example, users may wish to not be alerted to new business-related e-mails, or voice calls on a vacation day, or at specific times on a vacation day, even though they may desire to check in periodically for any critical emergencies. However, turning off the device, and thereby being completely out of communication would be undesirable to most users, in that they may welcome or need to receive calls or other communications of a personal nature.

Thus, the following disclosures relate to system architectures, devices, and software providing examples wherein a device can be made to more fully function as a device for both business and personal usages (or more broadly, for both personal usage and usage in an entity role). An example of a system in which such a device can function is first disclosed, along with certain aspects of the system. Then, aspects of example devices are disclosed, along with exemplary methods as to how such devices and the overall system can function. For clarity, an example relating to a device associated with a single business and a single user is presented. However, it will be clear from these disclosures that embodiments are in now way restricted only to such examples.

Further, although the example of a business and personal usage primarily is used herein, it would be apparent from these disclosures that embodiments according to these disclosures can relate to any device in which different behavior is to be enforced for data/applications related to an entity, while other behavior may be permissible in personal usage of the same device, and still other behavior may be permissible in a mode combining the entity behavior and personal behavior.

Thus, the following disclosure ultimately will describe systems, computer readable media, and devices where a device has a plurality of operating modes, a selection from which can be made by a user of the device. Each operating mode can be associated with one or more profiles. In turn, each of those profiles can be associated with data, applications, and other settings. A manager module or process on the device can control behavior of the applications and data availability based on the operating mode, and which profile or profiles are associated therewith. For example, in the case of a personal and business use phone, a personal profile and a business profile may be provided on the device, and the operating modes may comprise a personal mode, a business mode, and a unity mode. Both the personal profile and the business profile may be associated with the unity mode, and in such a mode, the profile manager would allow applications associated with either mode to conduct activities not otherwise inconsistent with policy. Many other examples and other characteristics will become apparent from the following description.

Figure 1:
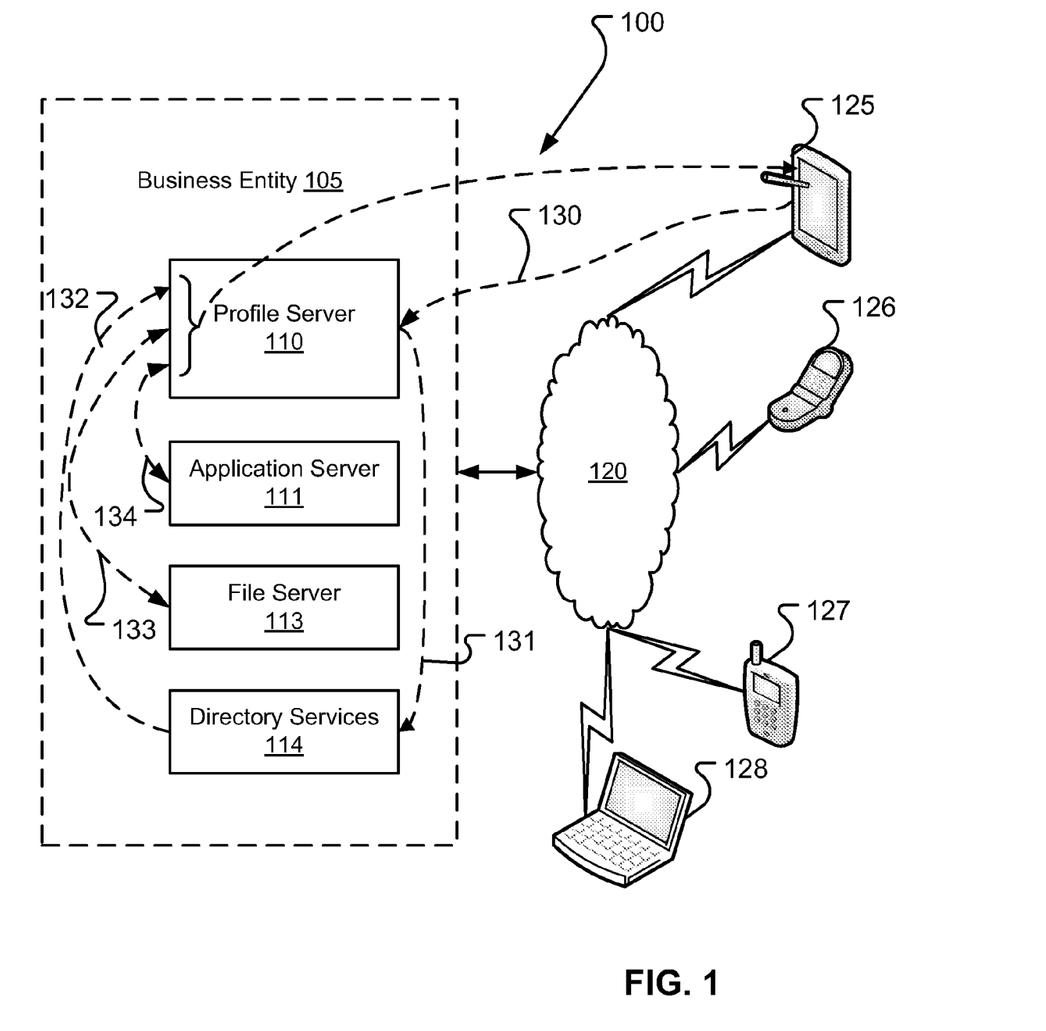
FIG. 1 depicts an example system view in which an entity may maintain a profile server, and other servers for connection with devices, such as a phone, having characteristics explained herein.

Turning first to a system overview, in a first example, FIG. 1 depicts an overall system architecture 100 comprising a network 120, over which a plurality of devices, such as Personal Digital Assistant 125, phones 126 and 127, and netbook 128 may communicate with one or more servers associated with a business entity 105. The servers comprise a profile server 110, an application server 111, file server 113, and directory services 114. The servers of business entity 105 also can communicate with each other for implementing some aspects disclosed herein. In some cases, network 120 need not be considered part of architecture 100, in that server(s) and devices can be provided that use any of a variety of networks, or use the Internet, for example, without modification or any particular provisioning.

In a particular example that will be described further below, PDA 125 communicates with profile server 110 via network 120 (illustrated by dashed line 130). In an example, PDA 125 provides a user credential to profile server 110, which in turn communicates with directory services 114 (dashed line 131) to identify a user based on information provided from PDA 125 in a return communication 132. In turn, profile server 110 communicates with application server 111 (line 134) and file server 113 (line 133) to obtain data and applications based on the returned directory services information. The returned data and applications can be provided by profile server 110 to PDA 125 (communication 133). Examples of the types of communications, functioning of PDA 125, profile server 110, directory services 114, and so on will be described below.

As outlined in FIG. 1, in some embodiments, a profile server receives incoming communications from a device. These communications, as explained below, are for determining data and applications which the device is authorized to receive according to credentials provided by the device. For example, a user can provide authentication credentials that allow for such determinations based on that user credential.

Figure 2:
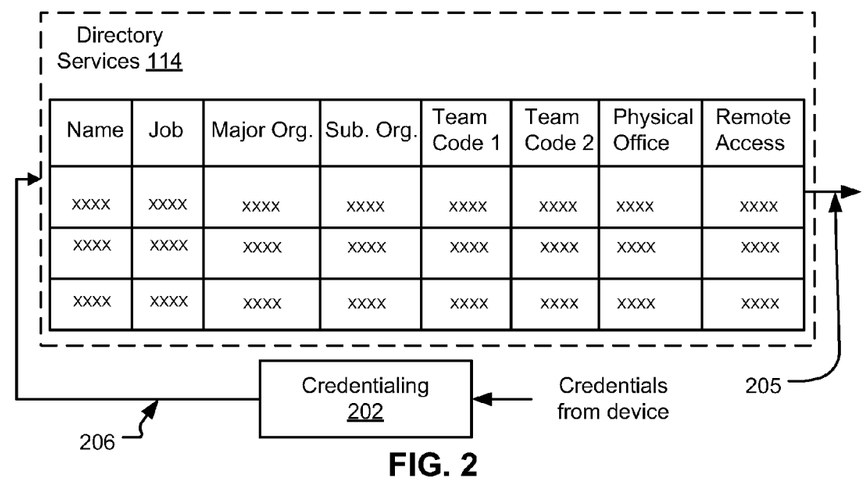
FIG. 2 depicts aspects of a directory server that can be used for matching a device-provided user credential with an entry, in order to identify an entity profile for the user.

FIG. 2 depicts an example of a server that can contain data for implementing directory services 114 (FIG. 1). In FIG. 2, credentials from a device (e.g., device 125) are inputted to a credentialing module 202. Credentialing module 202 can access a medium storing data that can be used to verify the credential presented by the device. For example, credentialing module 202 can hash a provided password, compare the hashed password to a stored password hash associated with a user identification and if they match, confirm the credential. Upon credential confirmation, a user identifier 206 can be provided for indexing the information available from directory services 114. As depicted, such information can include name, job title or code, one or more organizational codes, codes for cross-functional teams in which the user may be participating, physical office codes, as well as other information, such as whether remote access should be accorded to the user. These data items can be used by profile server 110 in assembling a profile that will be provided to the device that supplied the user credential, as explained below. Such profile may comprise data, applications, rights to access certain networks, encryption requirements for remote access, settings, such as how often re-authentication is required, and so on. For convenience, the profile provided by profile server 110 will be referred to as an "entity profile", in that it was supplied to the device from a server associated with an entity to which the user is associated or has some connection. Such an entity can be any organization, such as a family, a partnership, a charity, a political campaign, a corporation, and so on. Of course, information that may be used in determining an entity profile to be provided to the device, as well as the entity profile itself, would be expected to vary based on the organization. As such, FIG. 2 illustrates an example.

As explained above, a user credential can be supplied from a device to allow the device to be authenticated to receive an entity profile comprising applications, data and settings for provisioning the device. The entity profile can be determined by profile server 110 in response to the credentialing.

Figure 3:
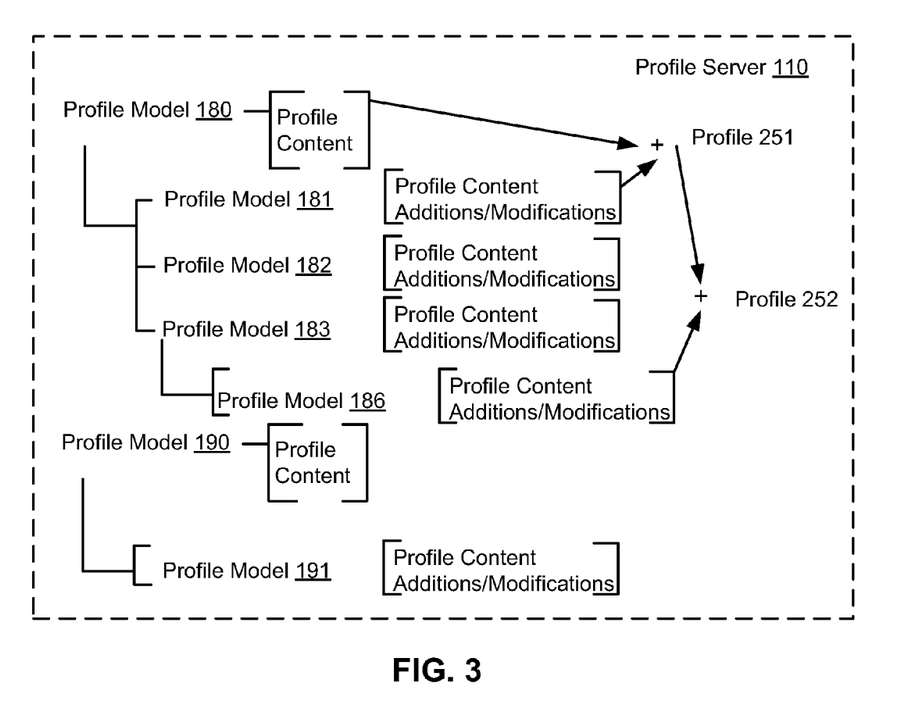
FIG. 3 depicts aspects of an example profile server, which can use outputs from the directory server in determining an entity profile for provision to the device of FIG. 1.

FIG. 3 depicts such an example, wherein profile server 110 stores a generally hierarchical set of profile components that can be selected based on information obtained from directory services 114. For example, there can be a plurality of top-level profile models, of which profile models 180 and 190 are depicted. Under each top-level profile-model, a plurality of other profile components can be used to refine the general model. A top-level model can be selected for a user based on organization and job description, or by business organization. For example, a user can be in a business organization producing software for mobile devices, and have a number of different roles, such as in development, marketing, testing, integration, and so on. Such roles would have different contact needs, different application needs, and so on. Then, further details can be increasingly refined by increasingly specific profile models. For example, a user may have different contact needs based on team that the user is currently on. Different information, such as local office maps, services and the like can be selected based on physical office location. Thus, not all information needs to be fit into a hierarchical category, but can instead be matrixed by linking or otherwise associating such information. Thus, profile models 181-183, 186, and 191 all represent different combinations and variations on these possibilities. After parsing the organization information pertinent to producing a profile for a given user, then profile server 110 can integrate these profile portions, and produce a profile for the user (profile 251 and profile 252 respectively illustrated as a sum of different components of different profile model components. Still further considerations that can be taken into account include the type of device making the credentialing request, at least for the reason that different devices can have different capabilities.

It also would be desirable to record information about the device that was making the credentialing request, and such information can be stored in directory services 114. For example, a device serial number can be stored. Thus, if a device with a different serial number, or more generally different identifying information, presents the same user credential, then action can be taken to determine whether such behavior is authorized. As such, directory services also can be considered as maintaining a registry of devices associated with users. Such registry also can be stored in profile server 110, or elsewhere as desired.

Figure 4:
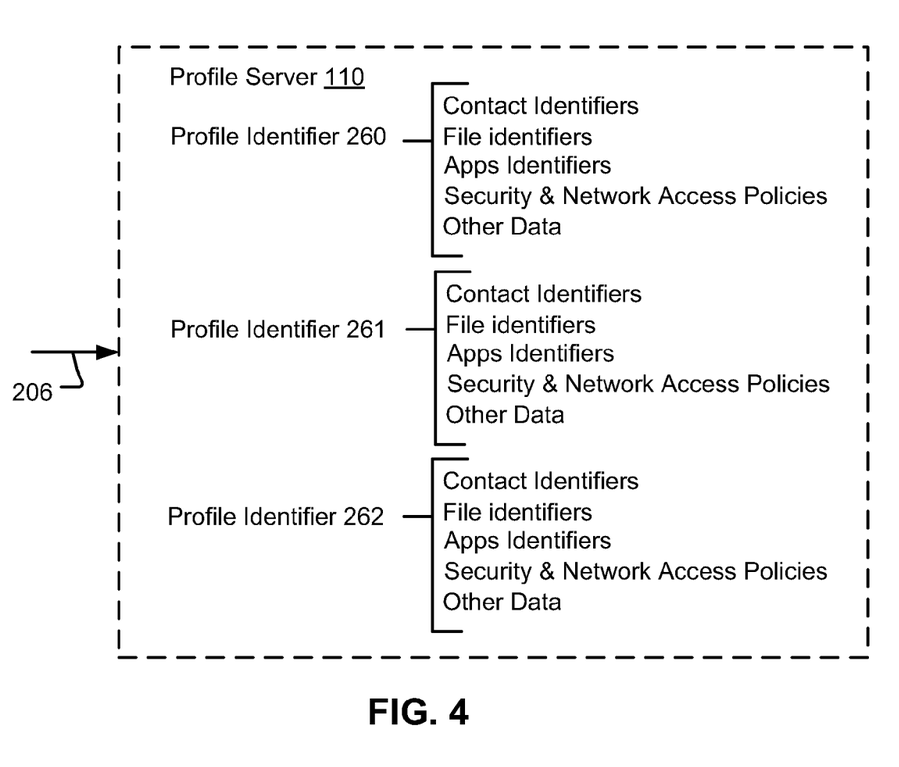
FIG. 4 depicts aspects of another example profile server.

FIG. 4 depicts aspects of another example profile server 110, in which user identification information can be submitted to profile server 110 and used to identify a profile that has been defined for the user. For example, when a new employee starts at a business, the new employee can be provided with a device, such as a phone or PDA, and an authentication credential. A business entity profile can be created for that user and stored in profile server 110. The user is provided with the credential, and when it is used through the provided device, credentialing can occur (see e.g., FIG. 3). Then user indentification information resulting from the credentialing can be used to index profile server 110. The result of indexing can include identifiers for contacts, file identifiers, identifiers of applications, security and network access policies and other data that should be made available based on the authorized credential. Each of these separate items of referenced information can be obtained from respective servers (as it may be undesirable to maintain copies of such information at profile server 110, since synchronization would then have to take place between profile server 110 and other repositories of such information). As such, profile identifiers 260-262 are each depicted in FIG. 4 as identifying respective sets of such information, which can be provided to different devices.

It would be apparent from the above description that not all such items must be present in a profile, nor that such items are an exhaustive list of the considerations that can be taken into account or the data that can be provided or referenced in a profile. Also, in many cases, there can be a 1:1 mapping between profile identifiers and users, but that is not required, and multiple users can be mapped to the same profile, and still further, multiple profiles can be mapped to the same user.

It also would be apparent that in most cases, it would be preferable to allow different categories of data and different applications to be functionally independent entities, and the organization of such information into a cohesive entity is provided through the profile semantic rather than explicit awareness on the part of individual applications or information sources of such associations.

In view of these disclosures, aspects of profile usage on devices will be described with respect to FIGS. 5-9.

Figure 5:
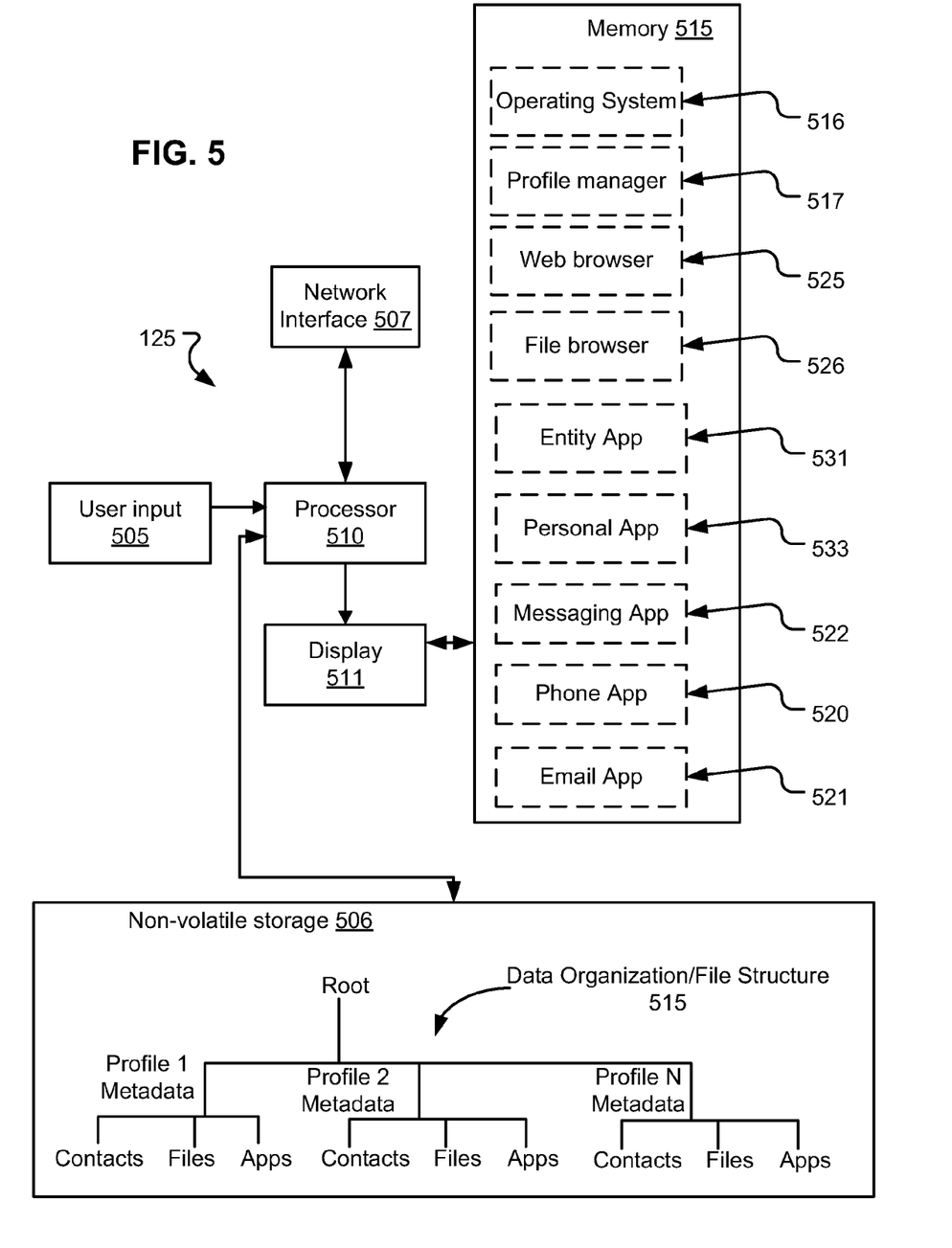
FIG. 5 depicts aspects of an example device that can be used as a device depicted in FIG. 1.

In FIG. 5, there is depicted a block diagram of an example device (depicted as device 125 of FIG.1 ). In FIG. 5, device 125 is depicted to include a network interface 507. Network interface 507 can be implemented using a plurality of different technologies, included wired and wireless communication technologies, even though it is expected that the predominant mechanism for communication will be wireless communication. Network interface 507 can represent a plurality of different wireless communications capabilities, including personal area network, local area network, and wide area network media access and physical layer technologies. Network interface 507 also can represent logical connections implemented on such physical resources, such as tunnels, VPNs, and the like.

Device 125 further comprises a processor 510 coupled with network interface 507. Processor 510 can be implemented as a general purpose processor, comprising one or more distinct processing cores, each of which can in turn process one or more threads of executable instructions. Processor 510 also can comprise, additional to, or instead of, a general programmable processor, one or more fixed function cores for executing various tasks that can include video and audio processing, signal processing, MAC level, network (e.g., IP) or session (e.g., TCP or UDP) layer processing, and so on. In some cases, processor 510 can be implemented using programmable gate arrays or similar technology. In the future, computing functions may be implemented differently.

Device 125 also comprises one or more sources of user input 505, which can include touch enabled displays, touch pads, gesture input, speech input, a mouse, a keyboard, and so on, which provides such user input for use in implementing functions on processor 510.

Additionally, a non-volatile storage 506 is provided to store profile data as illustrated. In this example, storage 506 is organized hierarchically in a file-system approach where associations between a given profile and contacts, files and applications, and the like is maintained by storing this data in locations associated with those profiles. Thus, as will be described further below, an operating system can determine what data is associated with a particular profile by reading a directory structure or equivalent structure from storage 506. In some cases, one application may be associated with a plurality of profiles. For example, it would be expected that messaging applications often would be associated with each profile on device 125. In such cases, a link can be provided to one location where the application code can be found for each profile associated with it. Of course, an application, or other types of data, can be repetitively stored on storage 506 as well, if desired.

Device 125 further comprises a memory 515, which typically can be implemented using dynamic RAM and/or or static RAM, and can comprise one or more caches, registers and/or other working memory to be used by processor 510. FIG. 5 illustrates that memory 515 has resident an operating system 516, a profile manager 517, and a plurality of applications. Some of these applications would be associated with a plurality of profiles, for example, web browser 525, file browser 526, messaging app 522, phone app 520, and e-mail app 521. However, other applications are associated only with a personal profile (e.g., personal app 533) and other applications are associated only with an entity profile (e.g., entity app 531). The permissible activities of the resident applications are controlled by profile manager 517, as explained in further detail below, with respect to FIGS. 6-9.

Figure 6:
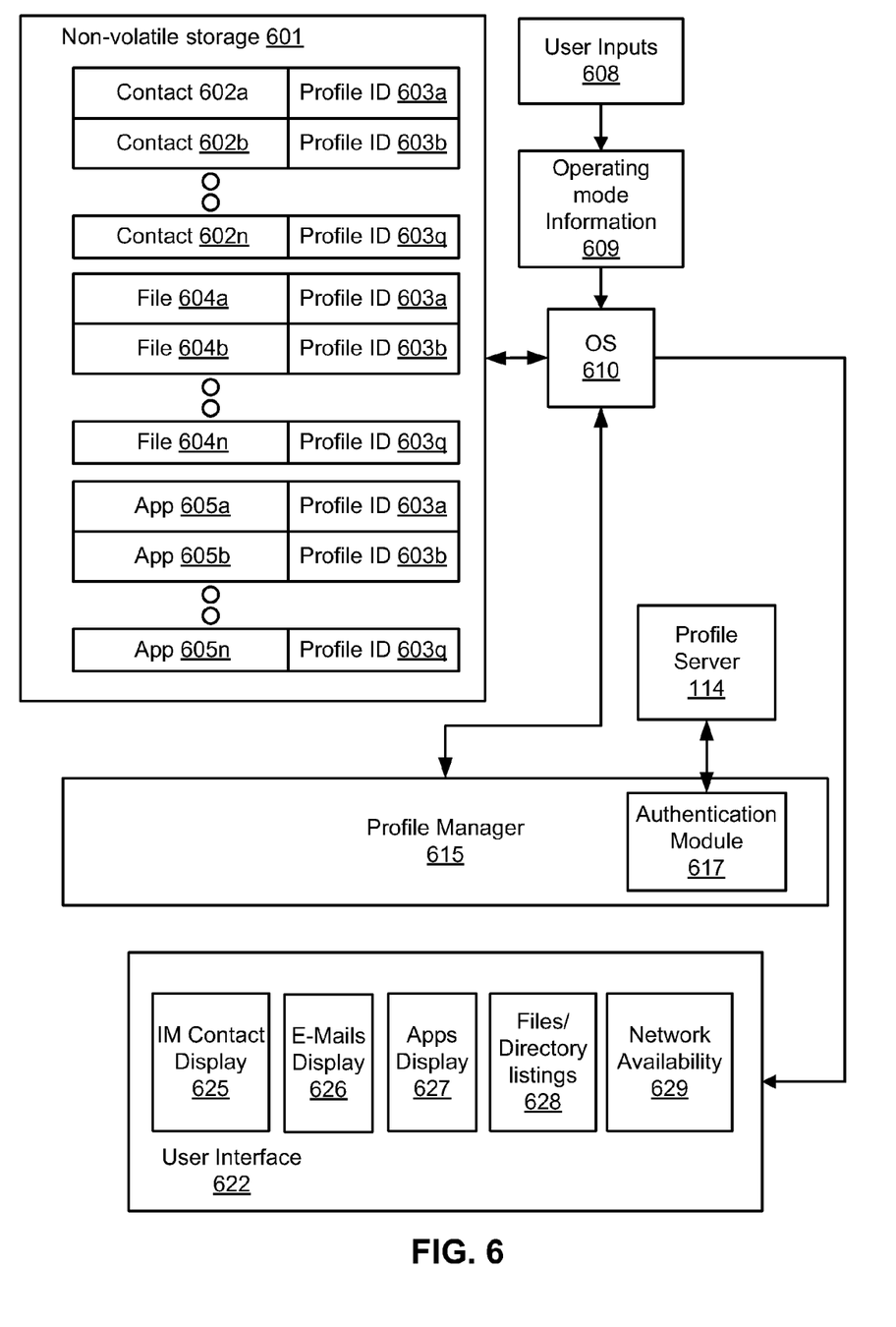
FIG. 6 depicts aspects of another example device.

FIG. 6 depicts aspects that can be employed in device 125 or other devices that can be used in the system depicted in FIG. 1. In FIG. 6, it is depicted that device 125 comprises a non-volatile storage 601, having stored thereon a list of contacts 602a-602n, a list of files 604a-604n, and a list of applications 605a-605, each of which can be referred to as a data item here. Each data item is associated with a profile ID (profile IDs 603a-603q depicted) that uniquely identifies a profile on device 125. In some cases, there may only be two profiles, such that only profile ID 603a and 603b would be used. As such, when Operating System (OS) 610 reads from storage 601, OS 610 can determine what profile is to be associated with a given data item based on its associated profile ID.

FIG. 6 further depicts that operating mode information 609 is obtained from user inputs 608 and provided through OS 610 to profile manager 615. Profile manager 615 comprises an authentication module 617 that can initiate communication with profile server 114. In turn, profile manager 615 uses operating mode information 609 and profile information obtained from profile server 114 to determine permissible behaviors of applications, as well as what information should be made available to a user through such applications. For example, FIG. 6 depicts user interface 622 as comprising an instant messenger contact display 625. Profile manager 625, based on operating mode and profile information can determine what contacts are to appear in that list, which can be displayed to the user, likewise, which e-mails are displayed in e-mail display 626 can be so determined.

Still further, a list of applications 627 available on the device can be managed based on operating mode and profile. In some cases, the applications can be shown as resident, but unavailable, if such applications are associated with a profile not associated with the current operating mode. Similarly, what files or directories are shown to be available in a directory listing 628 can be controlled by profile manager 615 based on operating mode and profile. Still further, which network, servers, and which physical network interfaces are available at any given time can also be controlled. Profile manager 615 may couple with OS 610 for implementing these controls. Now, more particular aspects of how such profile-based management can be implemented are addressed with respect to FIGS. 7-9.

A profile manager in accordance with these examples can provide a means for controlling activities of applications, such as actions that are user-perceivable, network activity, file access activity, and so on. Such a profile manager also can provide a means for verifying credentials to download and/or use items associated with a particular profile. Such profile manager means may be implemented in any combination of hardware and software. For example, a profile manager means may comprise one or more modules of computer executable code that can be compiled or are compiled for execution on a processor of a particular device, or for a particular processor architecture. A profile server programmed with computer executable code modules to track profiles for particular users, and/or to assemble such profiles based on directory information is an example means for making entity profiles available to a device over a network interface.

Figure 7:
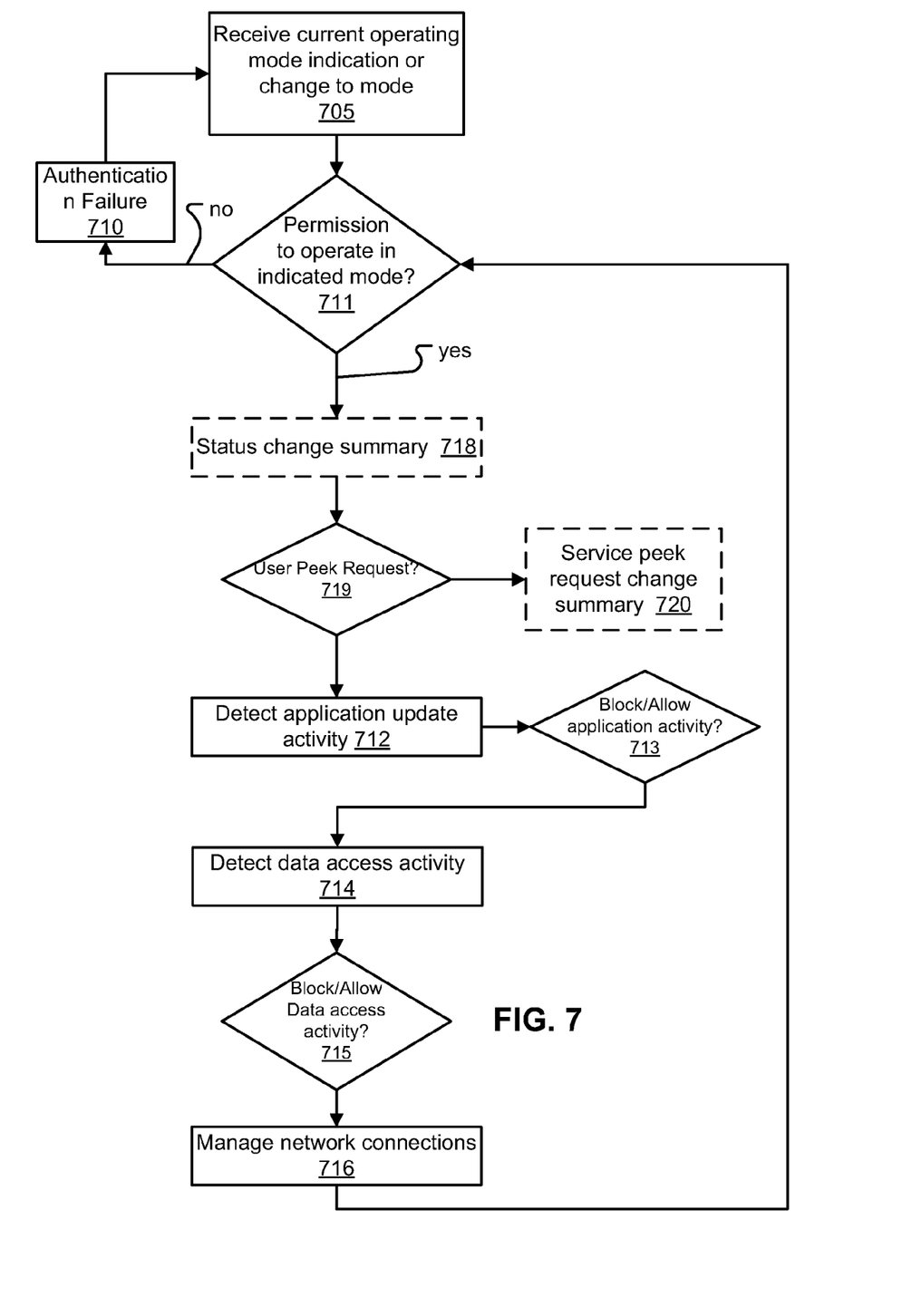
FIG. 7 depicts a flowchart depicting an example operating aspects for a device that may be used in the system of FIG. 1.

In a first example method, FIG. 7 depicts aspects of a general operating method that can comprise receiving (705) an active operating mode indication, which can be received based on user input or otherwise stored in an accessible location.

Figure 8:
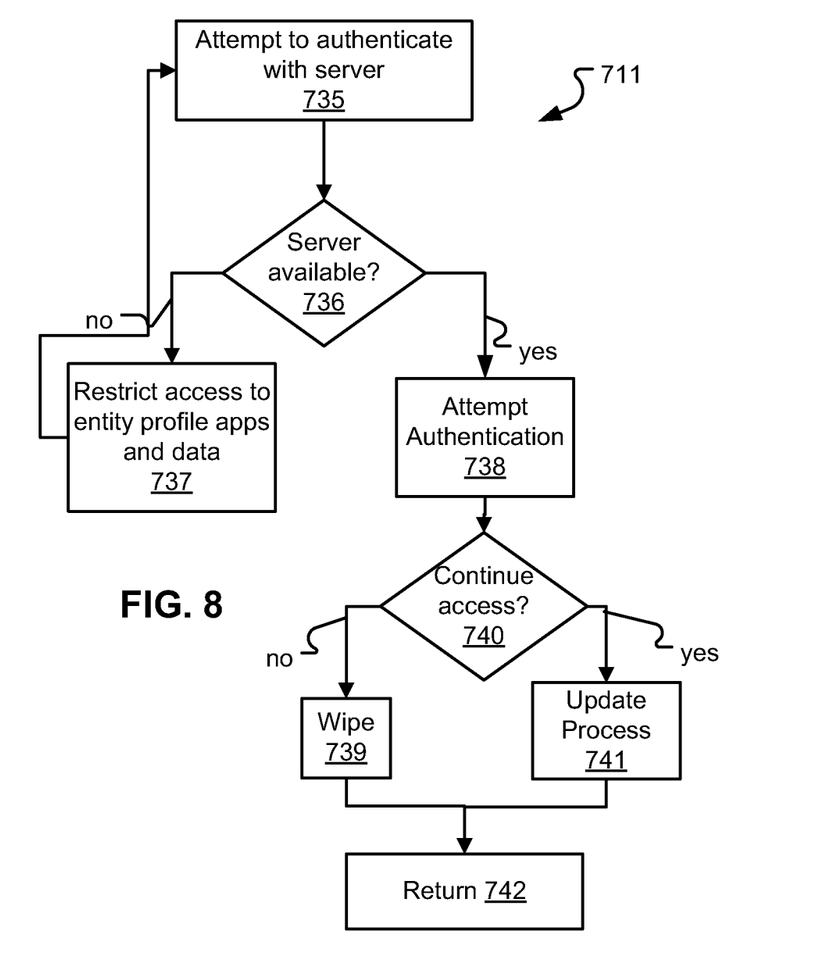
FIG. 8 illustrates an example authentication flow for use in a device according to these disclosures.

In 711, a determination is made as to whether there is permission to operate in the indicated mode. Such determination can include determining what profile or profiles are associated with the mode, and then determining whether any of these modes require authentication, and then determining whether such authentication has been obtained. If such authentication has been obtained, then it is determined that there is permission to operate in the current mode. FIG. 8 discloses aspects of an example method for determining such permission, and will be explained below.

Where a mode change indication was received (e.g., a user switches modes), and permission to operate in that mode is verified, a status summary can be produced 718 that displays a summary of new messages, calls, and other information that may be pertinent for that profile. For example, some applications may be available in the now-current mode that were not available in the previously-current mode, and a display of icons for those applications can be provided, while applications in common can be hidden. In some examples, a list of applications that have new status information to report can be provided. Other embodiments may provide other status summaries as appropriate.

Following a status summary, a user may interact with the device, and applications executing on the device may also be active. The following explanation thus includes activities initiated by a user as well as those initiated by applications themselves, operating with or without user input.

One example of interaction that a user may conduct is to peek at status information from another operating mode. Such a peek can be detected (719), and serviced (720). In many implementations, a status change will cause updates of the status change to propagate through applications to other users and other applications, on the device and elsewhere. Thus, a user may desire to avoid propagating status change information, if the user desires only to observe or review any new communications that may have arrived while in another mode, and which were not therefore announced or made available. Such a peek functionality may be serviced by producing a summary report of incoming communications, without propagating status information onto the network. This functionality can also be enabled in cooperation with a server that will service a peek request differently from a full operating mode change.

In further example, application update activity can be detected (712), which can include, for example, that an application is attempting to connect to a server over a network (e.g., an e-mail application is attempting to connect to an e-mail server to receive incoming messages). In other examples, such update activity can include, receiving monitoring of incoming call indications, listening on a port to receive a text, and so on. In other words, in some cases, applications can attempt to listen, connect, or otherwise monitoring incoming communication channels to be able to conduct normal application function, such as receiving e-mails.

However, in the method of FIG. 7, such activity can be restricted, blocked or allowed (713) based on determinations involving the current operating mode, and the profile(s) to which it is associated. For example, if operating in an entity mode, which is associated solely with an entity profile, an application associated with a personal profile may have restricted access, or may be entirely blocked from network access, port monitoring, and so on. In some cases, an application may be associated both the personal profile and an entity profile, such as telephone application, or an e-mail application. In those cases, the application may be permitted to receive incoming communication indications, but may be restricted from conducting user-perceptible activities, depending on more particular details. An example of such a situation involving incoming communications or requests to initiation communication is explained with respect to FIG. 9, below.

Other example application activities that can be restricted include accessing certain data stored on a device computer readable medium. For example, data access activity can be detected (714) and then a determination as to whether to block or allow that activity to proceed can be made (715). This determination also can be made based on the current operating mode, profiles associated therewith, and in some cases, particulars of the data being accessed and the application attempting such access. In one example, such access can be for an application to display contents of a directory (e.g., application 628 of FIG. 6). Thus, the determination to grant access would be made based on determining whether the data sought to be accessed is associated with any profile associated with the current operating mode. Such determination can be based on comparing a profile ID associated with the current mode with profile IDs of items in the directory (or the entire directory as a whole). A variety of other such data access determinations can be made. Also, rather than implementing a situation where data accessibility determinations are handled responsively to an access request, implementations determine, when operating mode changes, what data is to be made available in that mode. Combinations of these implementations can be provided, such that a startup determination can be made, and then responsive or maintenance determinations also can be made.

A further example activity that can occur during normal operation and depicted in FIG. 7 is management of network connections (716). Such management also can proceed based on current operating mode, and profile(s) associated therewith. In particular examples, network connection management (716) may comprise managing what baseband network(s) are available in a particular operating mode, or enforcing requirements for using encryption on all networks, allowing a wireless LAN interface to connect only with devices with trusted certificates, allowing access to certain servers or shares, allowing international calling, and so on. Such network connection management can be based on settings and policies provided with profiles associated with the current operating mode. In this situation, the management may require enforcement of a more stringent set of policies, between a plurality of profiles. By further example, international calling or phone use may be restricted to an entity profile, with the understanding that activities conducted in the entity profile may be subject to more stringent monitoring or other compliance related activities. For example, to travel internationally, only an entity profile may be active, and only contacts in an entity profile may be enabled. In still other examples, international roaming may be allowed in an operating mode associated with only a personal profile if the user has setup an appropriate calling plan on the device. In further examples, a user may be required to switch to such personal mode if attempting to call a number not in a directory associated with an entity profile and operating in a mode associated with the entity profile. These example thus illustrate a variety of profile-dependent decisions that can be made for network-related activities that can occur on the device.

The method depicted in FIG. 7 can return to continue verifying permission to operate in the current operating mode (711) and repeating other portions of FIG. 7. It would be apparent from this description that methods according to this example figure can include further profile/operating mode controls and other decision criteria, reorder, omit or substitute such controls and decisions. The categorization of such decision criteria and controls is also for convenience of description, and not by way of limitation. For example, application update activity can include network access and data access considerations, and therefore, there can be inter-dependence between network and data access controls and allowed application behavior.

As introduced above, FIG. 8 relates to an example approach to verifying permission to operate in an indicated operating mode. FIG. 8 depicts an example approach where such permissions are verified by authenticating with a user credential at a remote server over a network connection. Preferably, such authentication would occur periodically. In more particular detail, FIG. 8 depicts that an attempt to authenticate with an authentication server can be made (735), and can include presentation of a credential supplied to a user. If the server is available (736) then an authentication attempt occurs (738). If the attempt fails, a decision whether to continue allowing access can be made (740). If the decision is to deny further access, then the device can be instructed to remove all data, applications, settings, and permissions which are associated with the profile to which the user is no longer permitted access.

In a particular example, if the device is operating in a unity mode associated with both a business profile and a personal profile, authentication would be attempted at least for the business profile, and upon failure of authentication, then those features associated with the business profile would be removed or made unavailable on the device.

If authentication successes, then an update process 741 can proceed. Such an update process can involve inventorying the contents of the device associated with the profile authenticated, deleting old items, replacing items, adding new items, changing settings, policies, and so on.

However, returning to the server availability determination 736, if the server is unavailable then access can be restricted temporarily to applications, data, and the like associated with the currently active profile. Such temporary restriction can be viewed as an intermediate step between permanently deleting such profile data and applications, and suspending access pending reauthentication. It would be understood however that restrictive policies and setting generally would not be disabled. Then, the method can return to continue to attempt authentication with the server (735).

The permission verification can be made to occur periodically, such as on expiration of a timer, such as every 30 minutes, 60 minutes, every 10 seconds, every day, and so on.

Figure 9:
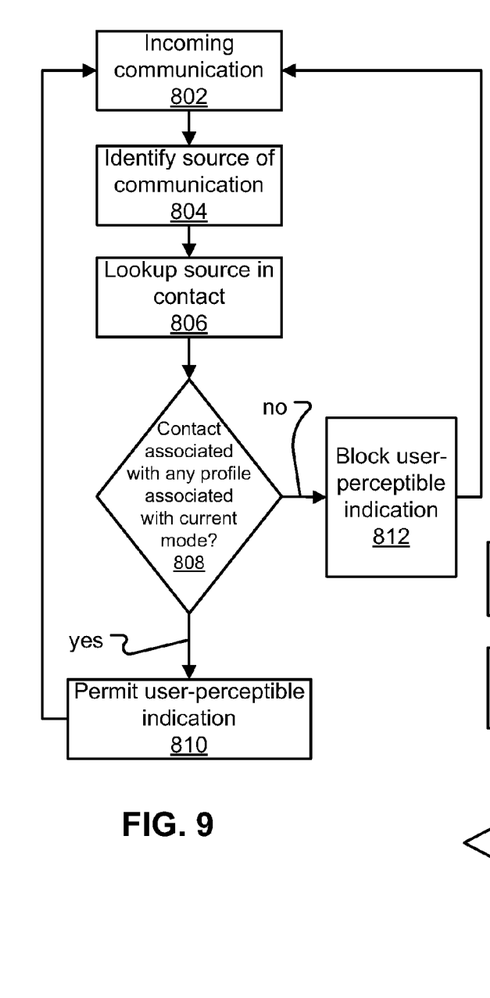
FIG. 9 depicts a flowchart wherein user-perceptible activities are controlled based on operating mode and the profile or profiles associated with that mode.

FIG. 9 depicts aspects of a method that a profile manager (e.g., profile manager 517 or profile manager 615) can implement in determining whether to allow an incoming communication request to create a user-perceptible notification. Controlling user-perceptible notifications can be implemented so that applications from profiles that are not currently associated with active modes can remain resident in memory, and can conduct activities not inconsistent with other policies. For example, at a summary level, a phone application can receive incoming communication requests, regardless of profile and operating mode, and then determine, based on operating mode, which of those requests should be reported to the user, and which should not be In the method of FIG. 9, an incoming communication is received (802) at the device (e.g., device 125). The communication can be in any of a variety of forms, including text message, e-mail, a voice call, and the like. The method comprises identifying (804) the source of communication and looking up the source in one or more contacts lists (806). Assuming the contact who is originating (sourcing) the incoming communication is found, then it is determined whether that contact is associated with any profile that is associated with the current operating mode. For example, if a contact is associated with the business profile, and the device is in a unity mode, then the contact is determined to be associated with a profile associated with the current operating mode, in that the business profile is associated with the unity mode. If there is a determination of such association, then the device is permitted to generate 810 a user-perceptible indication of such incoming communication.

Figure 10:
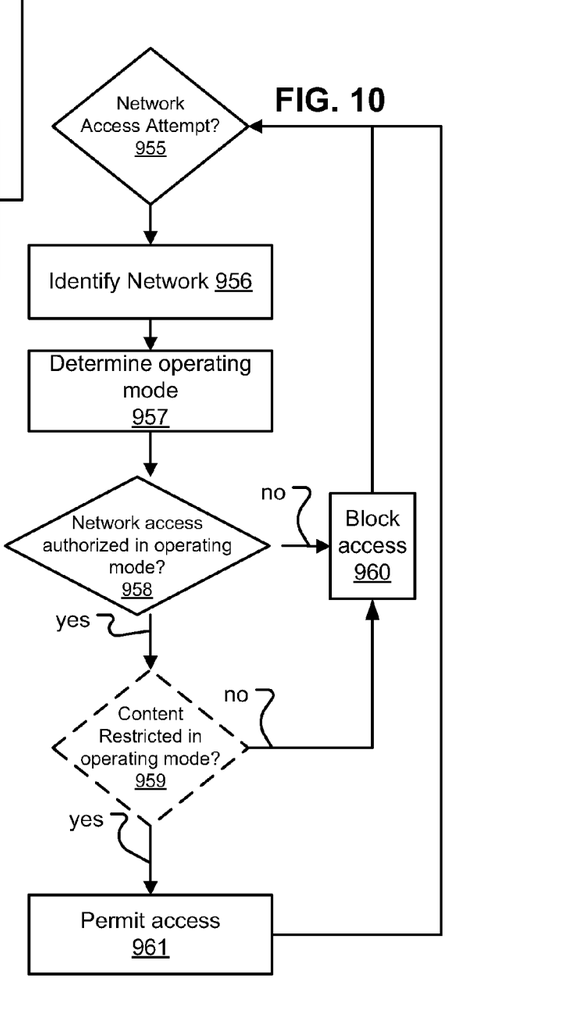
FIG. 10 depicts a further example of restricting network access based on operating mode, and the profile(s) associated therewith.

FIG. 10 depicts an example method for controlling network access based on operating mode and profile data. FIG. 10 depicts detecting (955) a network access attempt, and identifying (956) a network to which access is attempted. An operating mode can be determined (957). Then, a first decision (958) based on operating mode can be made, whether or not profile(s) associated with the operating mode allow that particular network access at all. If the access is not to be granted, then access is blocked (960), and the method can return to detecting (955) access attempts. If the profile(s) associated with the operating mode do not categorically prohibit that network access, then a further determination (959) whether to grant access can be made based on content restrictions. If access is permitted (961), then the method can return to detecting (955) network access attempts, and otherwise, the access can be blocked (960).

Some example usages in accordance with the method of FIG. 10 include that an entity profile may allow access to a particular network, or usage of a particular network resource, but may restrict what content can be accessed, downloaded, bandwidth constraints, and so on. Depending on implementation, these restrictions may be applied only in operating modes associated with the entity profile, or can be applied in every operating mode. For example, a company may prohibit usage of a company-owned device to download any content that may be in violation of an employment agreement. In another example, for an employee-owned device, an entity profile may only prohibit using company-provided network access to such content, or only when operating in a mode associated with the entity profile.

Techniques for management, maintenance, tracking, and inventory of fleets of phones by entities, such as businesses, can make use of the profile-based technologies described herein. For example, a business can allow a new employee an allowance to purchase a compliant device of their choice. Over the course of time, the employee may customize the device in a variety of ways, store data, and load applications on the device. Aside from the convenience of maintaining the device, these items can have value, such as purchased digital content. It would be likely that when the employee leaves the employ of that business, the employee would desire to retain personal data and applications, while a business would want their data and applications secured. Therefore, the separate profiles allow an easy separation of content and rights thereto. In some cases, the employee can be permitted to take the device, and all data, applications and so on associated with the entity profile would be wiped upon a failed authentication attempt (see FIG. 8). A user or employee also can maintain a backup of their personal profile on a personal computer, or a business computer for example.

In the above examples, other information included in a profile comprise bookmarks, application settings, subscriptions to particular syndicated feeds, website access, passwords for different resources, and so on.

As illustrated by variation in the devices capable of communicating with profile server 110 in FIG. 1, devices that can be used or otherwise embody these disclosures can vary widely, and no restriction on such devices is intended by this example.

In another particular example of entities for which profiles can be created, an entity may include a familial entity. In that situation, members of the familial entity may each have a device that is synced with a common entity profile, comprising information such as emergency contacts, calendars with reminders for family events, birthdays, anniversaries, and the like, settings, such as access policies, and so on. The server in such a situation can be implemented in a home environment or can be accessed over a network interface, such as over the Internet. The profiles also can be stored in multiple locations, if desired. A service to allow web-based profile maintenance can be provided.

By way of further example, a given user may have associations with a number of entities, for example, the user may have association with a plurality of business entities. For example, the user may be an independent contractor that performs work on projects for multiple companies. The user may have a family profile, and a personal profile as well. The personal profile may be a more refined instance of the family profile. An IP or server address or URL can be associated with each profile, which identifies from where updates are to originate, as well as from where periodic authentication can come, if implemented.

This disclosure includes flowcharts, however the flowcharts are not to be construed as requiring a particular order for the activities shown therein, or that all activities must or should be present in a particular embodiment, or that other activities cannot be added. Further, such activities need not necessarily be discretized in the way shown by these examples, but rather such activities can be implemented in more or fewer actions, or equivalents of such activities can be implemented in some embodiments.

This disclosure depicted a variety of flowcharts, and in some cases, these flowcharts are depicted in isolation from other flowcharts. Such isolation does not require or imply that these methods would execute in isolation, but rather in implementations, code according to such flowcharts can be implemented to cooperate, and in some cases, such code can use or rely on services and functions centrally provided, such as by an operating system. As such, these flowcharts do not imply the existence of discrete functional or code modules for methods according to these examples.

Similarly, example system diagrams necessarily have been abstracted to better emphasize aspects pertinent to embodiments. Thus, system embodiments can have additional components, fewer components, or different components, depending on considerations that can be taken into account by those of ordinary skill based on these disclosures.

The above disclosure provides examples and aspects relating to various embodiments within the scope of claims, appended hereto or later added in accordance with applicable law. However, these examples are not limiting as to how any disclosed aspect may be implemented, as those of ordinary skill can apply these disclosures to particular situations in a variety of ways.

I claim:

1. A device, comprising:
   a computer readable medium storing data and applications associated with a personal profile of a user of the device, and data and applications associated with an entity profile; and
   a processor with instructions for execution of a profile manager process, the profile manager process operable to:
   configure the data and applications associated with the personal profile based on a first user input, wherein the data associated with the personal profile are accessed and applications associated with the personal profile are executed when the device is used in a personal mode,
   configure the data and applications associated with the entity profile based on information provided by a remote profile server, wherein the data associated with the entity profile are accessed and applications associated with the entity profile are executed when the device is operating in an entity mode,
   configure a unity mode as a combination of the personal mode and the entity mode wherein data associated with the personal profile and the entity profile are accessed and applications associated with the personal profile and the entity profile are executed when the device is operating in the unity mode,
   receive a second user input indicative of an operating mode selected from the personal mode, the entity mode, and the unity mode,
   when operating in the personal mode, restrict access to data and applications associated with the entity profile that are not associated with the personal profile,
   when operating in the entity mode, restrict functionality of applications associated with the personal profile that are not associated with the entity profile, and
   when operating in the unity mode, permit functionality of both applications associated with the personal profile and applications associated with the entity profile, and permit access to data associated with the personal profile and data associated with the entity profile.

2. The device of claim 1, comprising a network interface, wherein the profile manager process is connected to the remote profile server over a network connection established via the network interface, the profile manager operable to:
   periodically present a user credential for authentication to the remote profile server,
   receive an authentication response from the remote profile server, and
   based on receiving the authentication response, determine privileges of the device for accessing the data and applications associated with the entity profile.

3. The device of claim 2, wherein the profile manager process is further configured to delete the entity profile from the device upon receiving a failed authentication response.

4. The device of claim 1, wherein the data associated with each of the personal profile and the entity profile comprises a respective set of contacts, and the profile manager process is operable to:
   provide notification of communication initiation requests only from contacts associated with the personal profile when in the personal mode, only from contacts associated with the entity profile when in the entity mode, and from contacts associated with either the entity or the personal profiles when in the unity mode.

5. The device of claim 1, wherein the profile manager process is operable to:
   receive a user request for status information on a non-active operating mode that is different from a currently active operating mode; and
   in response to the user request, present, in the active operating mode, a notification of a received communication associated with the non-active operating mode.

6. A computer readable storage medium storing computer executable instructions that, when executed by a processor, are operable to cause the processor to perform operations comprising:
   configuring data and applications associated with a personal profile of a user of a device based on a first user input, wherein the device is coupled to the storage medium, and wherein the data associated with the personal profile are accessed and applications associated with the personal profile are executed when the device is operating in a personal mode;
   configuring data and applications associated with an entity profile based on information provided by a remote profile server, wherein the data associated with the entity profile are accessed and applications associated with the entity profile are executed when the device is operating in an entity mode;
   configuring a unity mode as a combination of the personal mode and the entity mode wherein data associated with the personal profile and the entity profile are accessed and applications associated with the personal profile and the entity profile are executed when the device is operating in the unity mode;
   receiving a second user input indicative of an operating mode selected from the personal mode, the entity mode, and the unity mode;
   when operating in the entity mode, restricting access to data and applications associated with the entity profile that are not associated with the personal profile;
   when operating in the entity mode, restricting access to data and applications associated with the personal profile that are not associated with the entity profile; and
   when operating in the unity mode, permit functionality of both applications associated with the personal profile and applications associated with the entity profile, and permit access to data associated with the personal profile and data associated with the entity profile.

7. The storage medium of claim 6, wherein the instructions cause the processor to perform functions comprising:
   enforcing security policies for data associated with the entity profile, regardless of operating mode.

8. The storage medium of claim 6, wherein the instructions cause the processor to perform functions comprising:
   restricting access to the entity data upon a failure of the device to authenticate with the remote profile server.

9. The storage medium of claim 6, wherein the instructions cause the processor to perform functions comprising:
   connecting to the remote profile server over a network connection established via a network interface coupled to the device;
   periodically presenting a user credential for authentication to the remote profile server;

receiving an authentication response from the remote profile server; and based on receiving the authentication response, determining privileges of the device for accessing the data and applications associated with the entity profile.

10. The storage medium of claim 9, wherein the instructions cause the processor to perform functions comprising:
deleting the entity profile from the device upon receiving a failed authentication response.

11. The storage medium of claim 6, wherein the instructions cause the processor to perform functions comprising:
receiving a user request for status information on a non-active operating mode that is different from a currently active operating mode; and
in response to the user request, presenting, in the active operating mode, a notification of a received communication associated with the non-active operating mode.

12. A computer readable storage medium storing computer executable instructions for causing a computer to perform operations comprising:
storing, on a device, a personal profile associated with a user of the a device, the personal profile comprising personal applications, personal device settings, and personal data, wherein the personal profile is enabled when the device is operating in a personal mode;
storing an entity profile on the device, the entity profile comprising entity applications, entity data, and entity device settings, wherein the entity profile is enabled when the device is operating in an entity mode;
configuring a unity mode as a combination of both the personal profile and the entity profile wherein data associated with the personal profile and the entity profile are accessed and applications associated with the personal profile and the entity profile are executed when the device is operating in the unity mode;
accepting a user indication of a current operating mode selected from the personal mode, the entity mode, and the unity mode;
when operating in the personal mode, allowing access to the personal applications, personal data and personal device settings while preventing access to the entity applications, entity data and entity device settings;
when operating in the entity mode, allowing access to the entity applications, entity data and entity device settings while preventing access to the personal applications, personal data and personal device settings; and
when operating in the unity mode, allowing access to the entity and the personal applications, the entity and the personal data, and the entity and the personal device settings.

13. The computer readable storage medium of claim 12, wherein the device comprises a network interface, and wherein the instructions cause the computer to perform operations comprising:
connecting to a remote profile server over a network connection established via the network interface;
periodically presenting, for authentication to the remote profile server, a user credential of a user associated with the device;
receiving an authentication response from the remote profile server;
based on receiving the authentication response, determining privileges of the device for accessing the entity applications, entity data and entity device settings associated with the entity profile; and in response to determining the privileges, enforcing network security policies corresponding to the entity profile when operating in the unity mode or the entity mode.

14. The computer readable storage medium of claim 13, wherein the network security policies include requiring encryption usage to access the remote profile server.

15. The computer readable storage medium of claim 13, wherein the network security policies are configured to restrict access to the remote profile server when operating in the personal mode.

16. The computer readable storage medium of claim 13, comprising:
enforcing data security policies for entity data on the device regardless of the operating mode.

17. The computer readable storage medium of claim 12, wherein the instructions cause the computer to perform operations comprising:
receiving a user request for status information on a non-active operating mode that is different from a currently active operating mode; and
in response to the user request, presenting, in the active operating mode, a notification of a received communication associated with the non-active operating mode.

18. A system, comprising:
a device configured to:
store a personal profile associated with a user of the device, the personal profile comprising personal applications, personal device settings, and personal data, wherein the personal profile is enabled when the device is operating in a personal mode;
store an entity profile on the device, the entity profile comprising entity applications, entity data, and entity device settings, wherein the entity profile is enabled when the device is operating in an entity mode;
configure a unity mode as a combination of both the personal profile and the entity profile wherein data associated with the personal profile and the entity profile are accessed and applications associated with the personal profile and the entity profile are executed when the device is operating in the unity mode;
accept a user indication of a current operating mode selected from the personal mode, the entity mode, and the unity mode;
when operating in the personal mode, allow access to the personal applications, personal data and personal device settings while preventing access to the entity applications, entity data and entity device setting;
when operating in the entity mode, allow access to the entity applications, entity data and entity device settings while preventing access to the personal applications, personal data and personal device settings; and
when operating in the unity mode, allow access to the entity and the personal applications, the entity and the personal data, and the entity and the personal device settings.

19. The system of claim 18, wherein respective sets of contacts are associated with each of the personal profile and the entity profile and scopes of authorization comprise restricting user-perceptible indications notifications of incoming communications from contacts not in the contact set for the current operating mode.

20. The system of claim 18, wherein the device comprises a network interface, and wherein the device is configured to:
connect to a remote profile server over a network connection established via the network interface;
periodically present, for authentication to the remote profile server, a user credential of the user associated with the device;

receiving an authentication response from the remote profile server;

based on receiving the authentication response, determining privileges of the device for accessing the entity applications, entity data and entity device settings associated with the entity profile; and in response to determining the privileges, enforcing network security policies corresponding to the entity profile when operating in the unity mode or the entity mode.

21. The system of claim 18, wherein the device is configured to:

receive a user request for status information on a non-active operating mode that is different from a currently active operating mode; and in response to the user request, present, in the active operating mode, a notification of a received communication associated with the non-active operating mode.

22. A system, comprising:

a computer readable medium storing data and applications associated with a personal profile of a user of a device, and data and applications associated with an entity profile; and a processor with computer executable instructions for execution of a profile manager process, the profile manager process operable to:

configure the data and applications associated with the personal profile based on a first user input, wherein the data associated with the personal profile are accessed and applications associated with the personal profile are executed when the device is used in a personal mode;

configure the data and applications associated with the entity profile based on information provided by a remote profile server, wherein the data associated with the entity profile are accessed and applications associated with the entity profile are executed when the device is operating in an entity mode;

configure a unity mode as a combination of both the personal profile and the entity profile wherein data associated with the personal profile and the entity profile are accessed and applications associated with both the personal profile and the entity profile are executed when the device is operating in the unity mode;

receive a second user input indicative of an operating mode selected from the personal mode, the entity mode, and the unity mode;

when operating in the personal mode, restrict access to data and applications associated with the entity profile that are not associated with the personal profile;

when operating in the entity mode, restrict access to data and applications associated with the personal profile that are not associated with the entity profile; and when operating in the unity mode, permit functionality of both applications associated with the personal profile and applications associated with the entity profile, and permit access to data associated with the personal profile and data associated with the entity profile.

23. The system of claim 22, wherein the entity profile is customized to the user of the device by the remote profile server based on a credential presented during an authorization process by the device to the remote profile server.

24. The system of claim 22, wherein the profile manager process is connected to the remote profile server over a network connection established via a network interface coupled to the device, the profile manager operable to:

periodically present a user credential for authentication to the remote profile server;

receive an authentication response from the remote profile server; and based on receiving the authentication response, determine privileges of the device for accessing the data and applications associated with the entity profile.

25. The system of claim 22, wherein the profile manager process is operable to:

receive a user request for status information on a non-active operating mode that is different from a currently active operating mode; and in response to the user request, present, in the active operating mode, a notification of a received communication associated with the non-active operating mode.

26. A system comprising:

instructions stored in a computer-readable storage medium that, when executed by a processor, are operable to cause the processor to perform operations comprising:

storing, on a device, a personal profile associated with a user of the device, the personal profile comprising personal applications, personal device settings, and personal data, wherein the personal profile is enabled when the device is operating in a personal mode;

storing an entity profile on the device, the entity profile comprising entity applications, entity data, and entity device settings, wherein the entity profile is enabled when the device is operating in an entity mode;

configuring a unity mode as a combination of both the personal profile and the entity profile wherein data associated with the personal profile and the entity profile are accessed and applications associated with the personal profile and the entity profile are executed when the device is operating in the unity mode;

accepting a user indication of a current operating mode selected from the personal mode, the entity mode, and the unity mode;

when operating in the personal mode, allowing access to the personal applications, personal data and personal device settings while preventing access to the entity applications, entity data and entity device settings;

when operating in the entity mode, allowing access to the entity applications, entity data and entity device settings while preventing access to the personal applications, personal data and personal device settings; and when operating in the unity mode, allowing access to the entity and the personal applications, the entity and the personal data, and the entity and the personal device settings.

27. The system of claim 26, wherein the instructions cause the processor to perform operations comprising:

connecting to a remote profile server over a network connection established via a network interface coupled to the device;

periodically presenting, for authentication to the remote profile server, a user credential of a user associated with the device;

receiving an authentication response from the remote profile server;

based on receiving the authentication response, determining privileges of the device for accessing the entity applications, entity data and entity device settings associated with the entity profile; and in response to determining the privileges, enforcing network security policies corresponding to the entity profile when operating in the unity mode or the entity mode.

28. The system of claim 26, wherein the instructions cause the processor to perform operations comprising:
- receiving a user request for status information on a non-active operating mode that is different from a currently active operating mode; and
- in response to the user request, presenting, in the active operating mode, a notification of a received communication associated with the non-active operating mode.

\* \* \* \* \*

UNITED STATES PATENT AND TRADEMARK OFFICE
CERTIFICATE OF CORRECTION

PATENT NO. : 9,183,534 B2  
APPLICATION NO. : 12/484142  
DATED : November 10, 2015  
INVENTOR(S) : Sam Gharabally

Page 1 of 1

It is certified that error appears in the above-identified patent and that said Letters Patent is hereby corrected as shown below:

Claims

Column 15, Line 23; In Claim 12, after "the" delete "a".

Signed and Sealed this
Fifteenth Day of March, 2016

Michelle K. Lee
*Director of the United States Patent and Trademark Office*